(12) United States Patent
Imming et al.

(10) Patent No.: US 9,396,077 B2
(45) Date of Patent: Jul. 19, 2016

(54) REDUNDANT LOCATION ADDRESS MAPPER

(71) Applicant: GLOBALFOUNDRIES INC., Grand Cayman (KY)

(72) Inventors: Kerry C. Imming, Rochester, MN (US); Emmanuel Sacristan, Rochester, MN (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 245 days.

(21) Appl. No.: 14/063,678

(22) Filed: Oct. 25, 2013

(65) Prior Publication Data
US 2015/0121022 A1 Apr. 30, 2015

(51) Int. Cl.
*G06F 11/20* (2006.01)
*G06F 11/16* (2006.01)

(52) U.S. Cl.
CPC ........ *G06F 11/2058* (2013.01); *G06F 11/1666* (2013.01); *G06F 11/20* (2013.01)

(58) Field of Classification Search
None
See application file for complete search history.

(56) References Cited

U.S. PATENT DOCUMENTS

| | | | |
|---|---|---|---|
| 6,332,177 B1 | 12/2001 | Humlicek | |
| 6,665,780 B1 | 12/2003 | Bradley | |
| 6,694,406 B2 | 2/2004 | Kodama et al. | |
| 8,250,283 B1 | 8/2012 | Lee et al. | |
| 2005/0193179 A1* | 9/2005 | Cochran | G06F 11/2058 711/162 |
| 2006/0149872 A1* | 7/2006 | Natarajan et al. | 710/74 |
| 2006/0277432 A1* | 12/2006 | Patel et al. | 714/6 |
| 2014/0040661 A1* | 2/2014 | Goel | G06F 11/1088 714/6.12 |

OTHER PUBLICATIONS

Torkestani et al., "RAID-RMS: A fault tolerant stripped mirroring RAID architecture for distributed systems", Computers & Security 28 (2009) 40-46, © 2008 Elsevier Ltd. DOI: 10.1016/j.cose.2009.09.001.

* cited by examiner

*Primary Examiner* — Brian Peugh
*Assistant Examiner* — Dustin Bone
(74) *Attorney, Agent, or Firm* — Thompson Hine LLP

(57) ABSTRACT

The present disclosure includes mapping redundant addresses in a multi-node system by receiving a first address and a first node ID, determining a first address type representing an address redundancy level for the first address, determining a first node ID type representing a node ID redundancy level for the first node ID, and determining a second address and a second node ID based on the first address type and the first node ID type.

17 Claims, 8 Drawing Sheets

Redundant Mapper Method

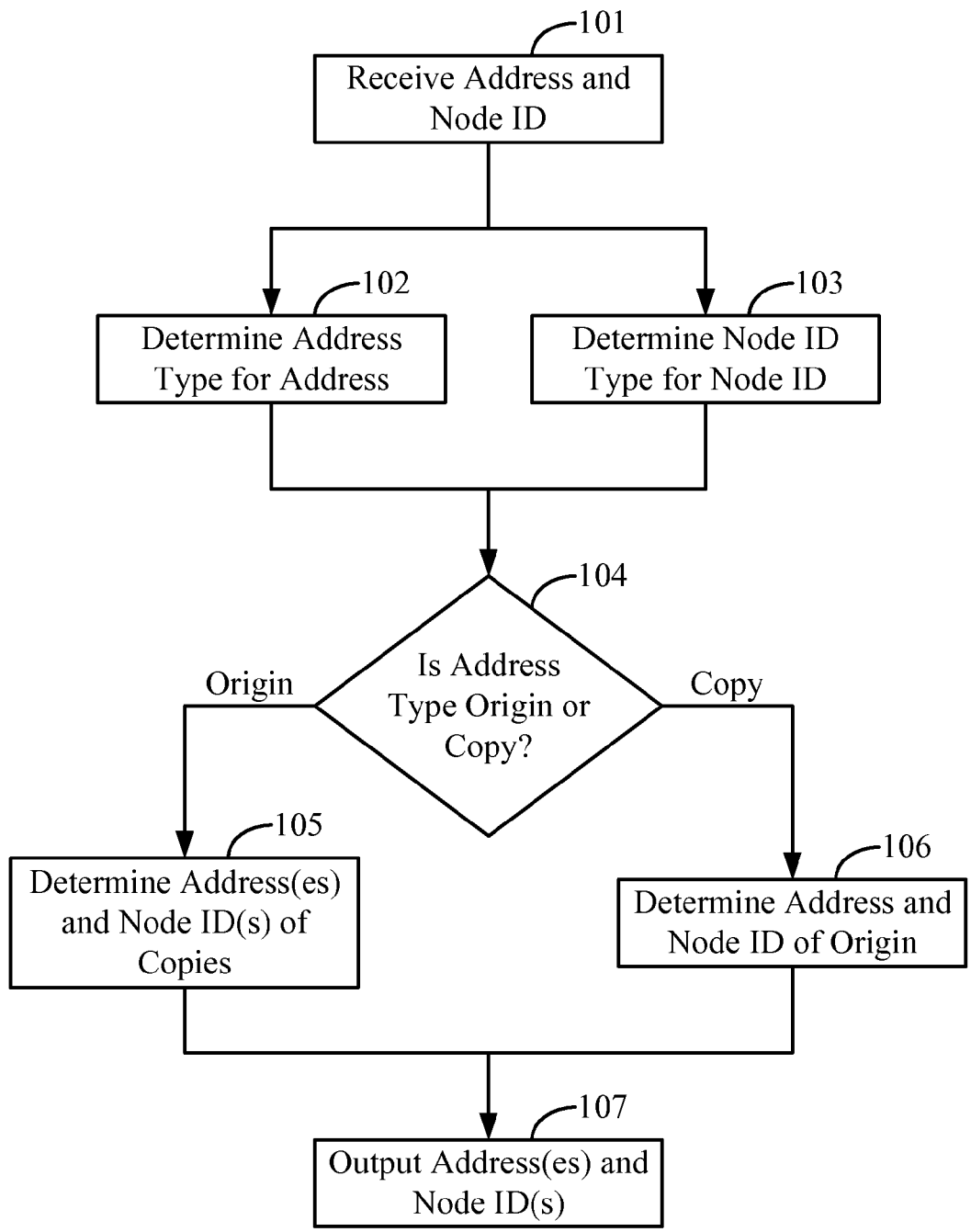
FIG. 1 – Redundant Mapper Method

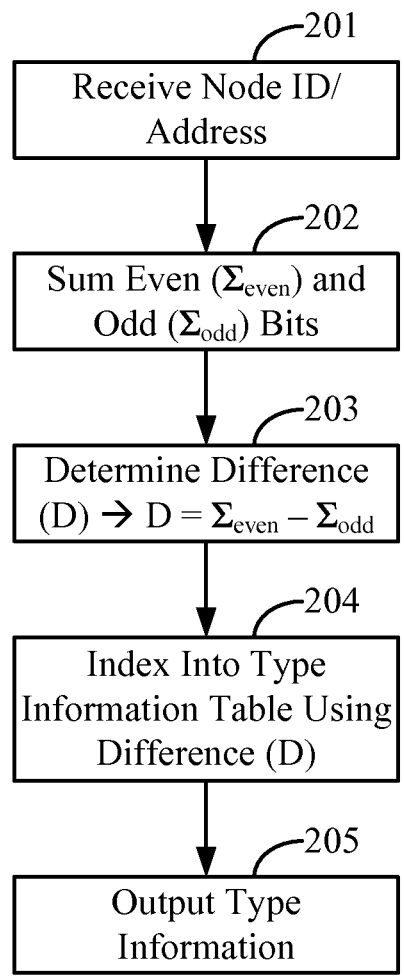
FIG. 2 – Type Finder Method

|  | | Node A<br>00 | Node B<br>01 | Node C<br>10 |
|---|---|---|---|---|
| Address Type | 00 | A | B | C |
|  | 01 | C' | A' | B' |
|  | 10 | B" | C" | A" |

FIG. 3A – Redundancy Group Matrix

| Input<br>Node ID | Input<br>Address | Copy 1<br>Node ID | Copy 1<br>Address | Copy 2<br>Node ID | Copy 2<br>Address |
|---|---|---|---|---|---|
| 00 | 00 | 01 | 01 | 10 | 10 |
| 01 | 00 | 10 | 01 | 00 | 10 |
| 10 | 00 | 00 | 01 | 01 | 10 |

FIG. 3B – Copies from Origin

| Input<br>Node ID | Input<br>Address | Origin<br>Node ID | Origin<br>Address |
|---|---|---|---|
| 00 | 01 | 10 | 00 |
| 00 | 10 | 01 | 00 |
| 01 | 01 | 00 | 00 |
| 01 | 10 | 10 | 00 |
| 10 | 01 | 01 | 00 |
| 10 | 10 | 00 | 00 |

FIG. 3C – Origin from Copies

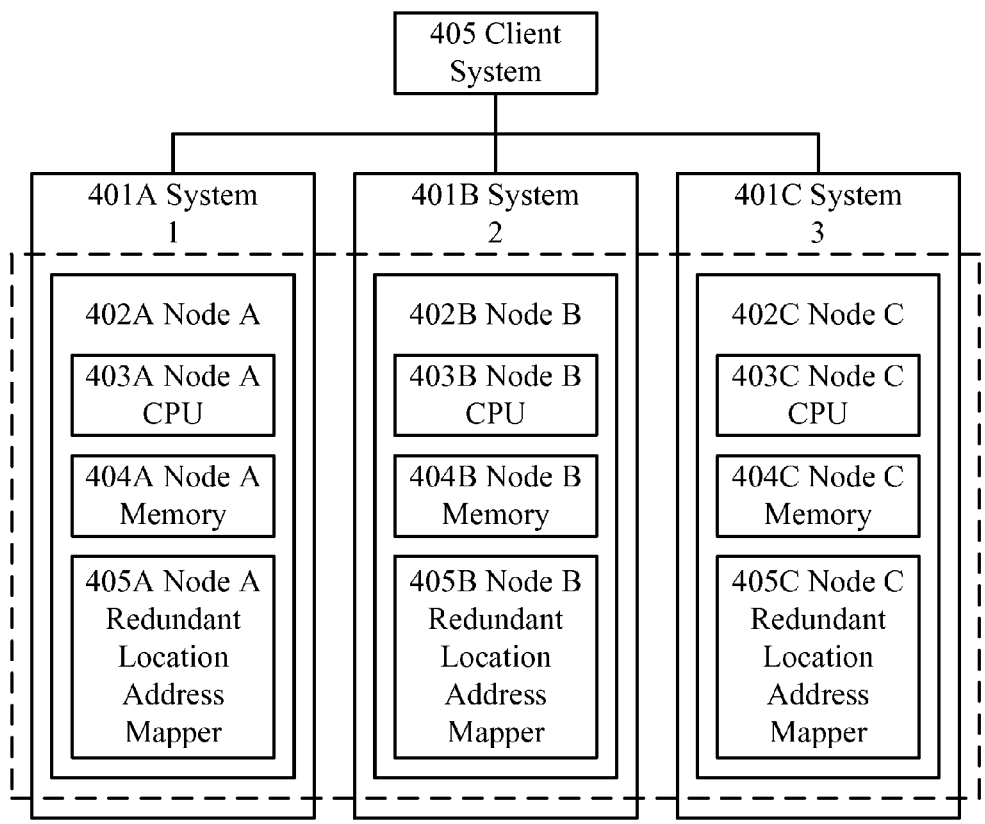
FIG. 4 – Memory System Diagram

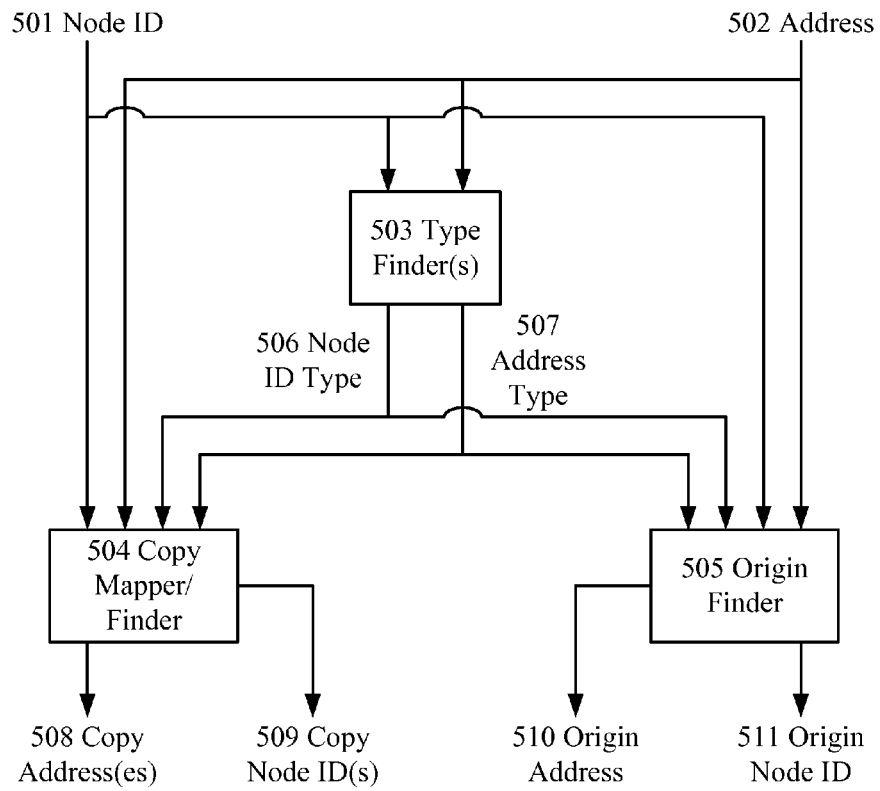
FIG. 5A – Redundant Location Mapper
| 507 Address Type | 510 Origin Address | 511 Origin Node ID | 508A Copy 1 Address | 509A Copy 1 Node ID | 508B Copy 2 Address | 509B Copy 2 Node ID |
|---|---|---|---|---|---|---|
| 00 | - | - | 1 | 1 | 1 | 1 |
| 01 | 1 | 1 | - | - | - | - |
| 10 | 1 | 1 | - | - | - | - |
FIG. 5B – Output Truth Table

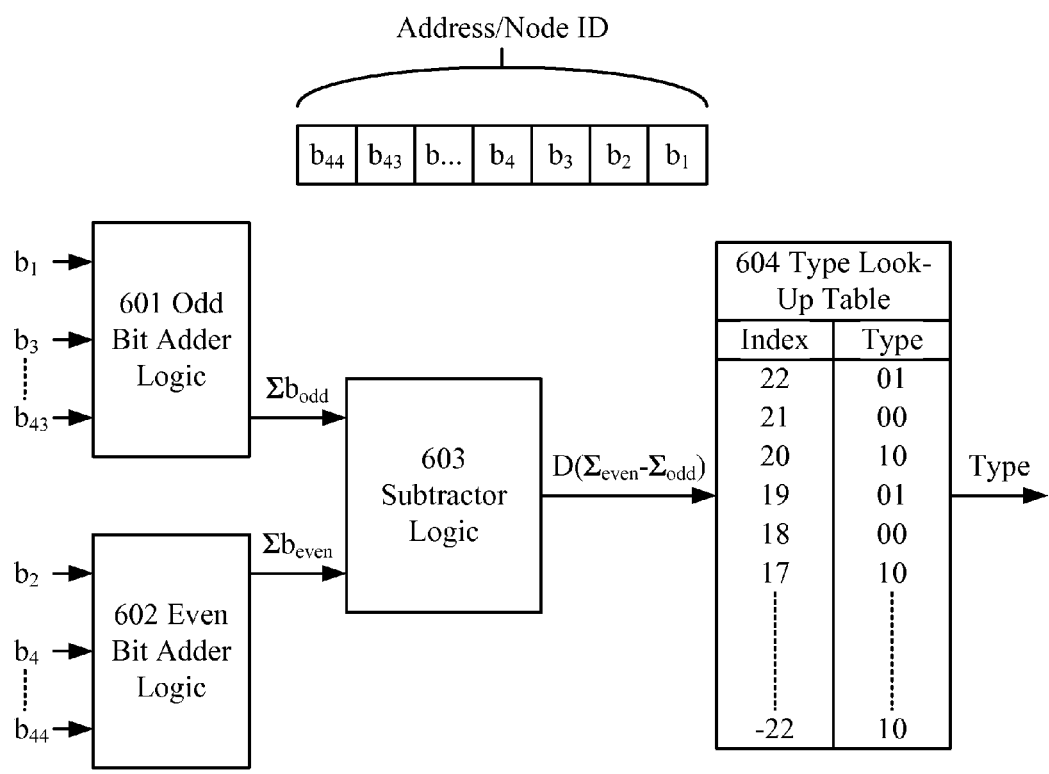
FIG. 6 – Type Finder Logic

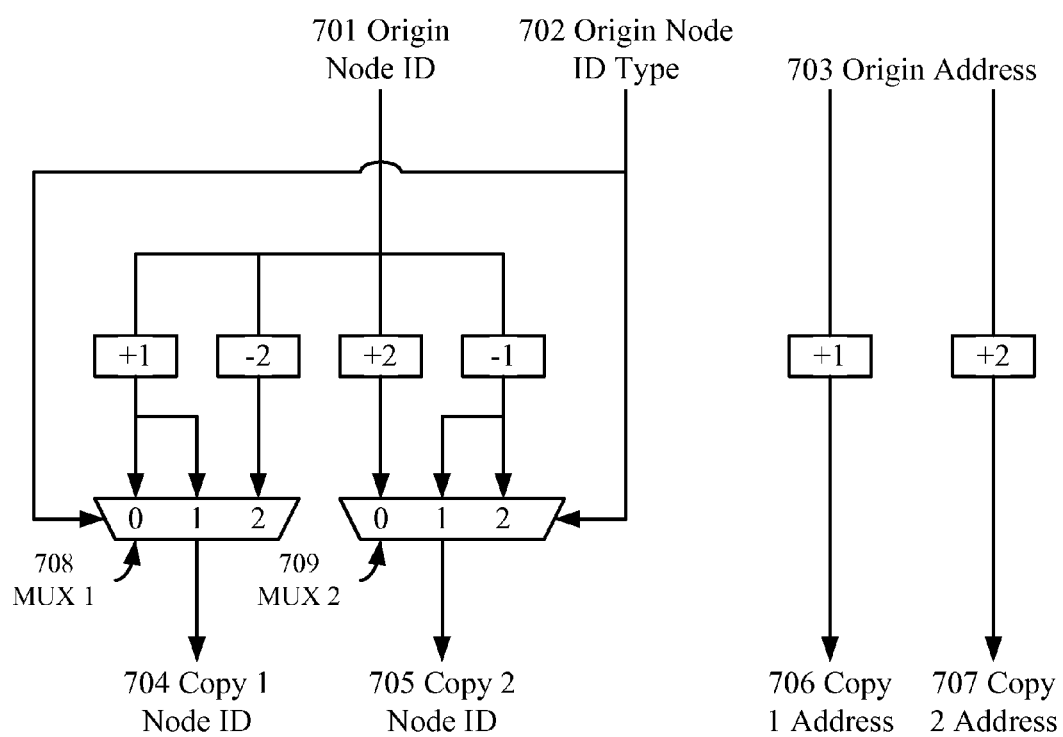
FIG. 7 – Copy Mapper/Finder Logic

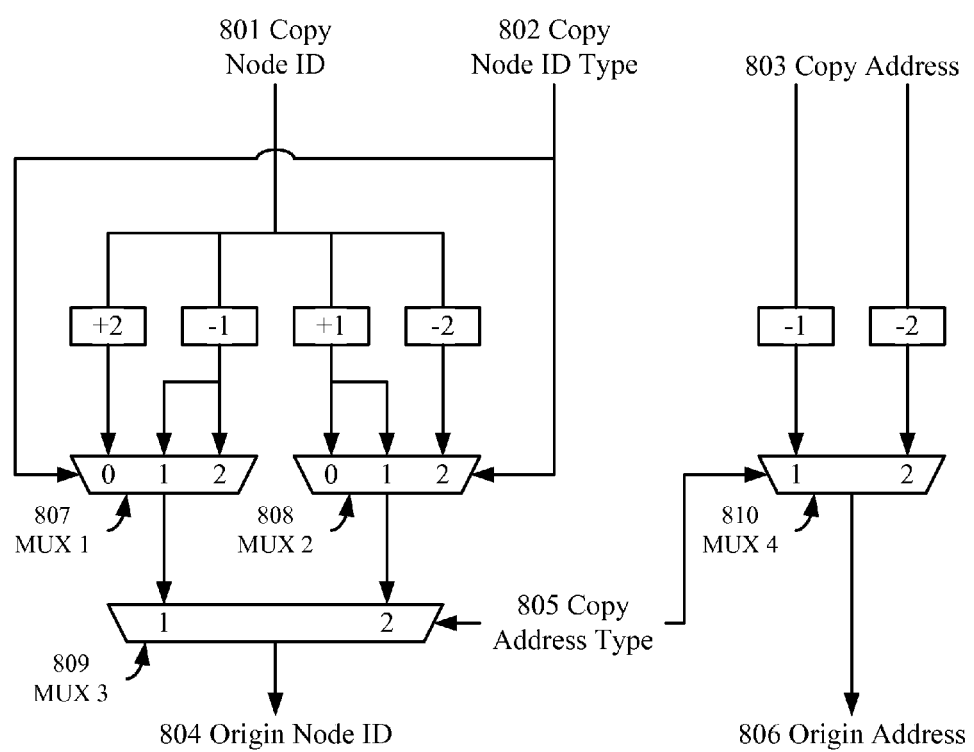
FIG. 8 – Origin Finder Logic

US 9,396,077 B2

REDUNDANT LOCATION ADDRESS MAPPER

FIELD

This disclosure relates to address mapping. In particular, it relates to a redundant location address mapper.

BACKGROUND

Solid state disk (SSD) and in-memory databases are two ways of speeding up database analytic operations. A set of properties dubbed ACID (atomicity, consistency, isolation, durability) ensure that database transactions are processed reliably. Database software confirms that an entire transaction is written back to permanent (disk) storage before indicating that the transaction is complete. This prevents a partial transaction from changing the database in the event of a hardware failure.

Durability is problematic with both in-memory and SSD databases. Completed transactions must still be written to disk for an in-memory database since memory is volatile. SSD drives suffer from a problem called wear-out and only support a limited number of writes during their lifetime. It is advantageous to batch database updates to minimize the number of writes and thus extend the life of the SSD.

Keeping these pending updates in system memory requires that the memory be made fault tolerant. There is a range of fault tolerance options related to the type of faults that can occur. Error correction code in memory allows recovery from soft error and DRAM failures. Mirrored memory can tolerate entire DIMM or memory channel failures. To tolerate processor or system failures, a redundant copy of modified memory may be kept on a separate system in a computer cluster.

SUMMARY

The present disclosure includes a method for mapping addresses for redundant data in a multi-node system that includes receiving a first address and a first node ID, determining a first address type representing an address redundancy level for the first address, determining a first node ID type representing a node ID redundancy level for the first node ID, and determining a second address and a second node ID based on the first address type and the first node ID type.

The present disclosure also includes a method for accessing addresses for redundant data in a multi-node system that includes receiving a first address and a first node ID, decoding a first address type representing an address redundancy level from the first address, decoding a first node ID type representing a node ID redundancy level from the first node ID, and determining a second address and a second node ID based on the first address type and the first node ID type.

The present disclosure includes a redundant system having a first number of nodes, each node having a processor, a memory, and a redundant address mapper. The redundant address mapper has an address type finder configured to determine a first address type representing an address redundancy level for a first address, a node ID type finder configured to determine a first node ID type representing a node ID redundancy level for a first node ID, a copy finder configured to determine a second address and a second node ID from the first address, the first address type, the first node ID, and the first node ID type, and an origin finder configured to determine a third address and a third node ID from the first address, the first address type, the first node ID, and the first node ID type.

BRIEF DESCRIPTION OF THE DRAWINGS

The drawings included in the present application are incorporated into, and form part of, the specification. They illustrate embodiments of the present invention and, along with the description, serve to explain the principles of the invention. The drawings are only illustrative of typical embodiments of the invention and do not limit the invention.

FIG. 1 is a method of mapping redundant memory locations in a redundant system, according to embodiments of the disclosure.

FIG. 2 is a method for determining an address or node ID type using a type finder for a three node redundancy group, according to embodiments of the disclosure.

FIG. 3A is an example matrix of original and redundant memory mapping locations of a three node redundancy group, according to embodiments of the disclosure. FIG. 3B is an example table of redundant copy locations based on origin locations for a three node redundancy group, according to embodiments of the disclosure. FIG. 3C is an example table of origin locations based on redundant copy locations for a three node redundancy group, according to embodiments of the disclosure.

FIG. 4 is a diagram of a distributed memory system utilizing one or more redundant location address mappers, according to embodiments of the disclosure.

FIG. 5A is a diagram of a redundant memory location mapper having a three node redundancy group, according to embodiments of the disclosure. FIG. 5B is an example truth table of outputs from the redundant memory location mapper having a three node redundancy group, according to embodiments of the disclosure.

FIG. 6 is a diagram of type finder logic, according to embodiments of the disclosure.

FIG. 7 is a diagram of copy mapper/finder logic, according to embodiments of the disclosure.

FIG. 8 is a diagram of origin finder logic, according to embodiments of the disclosure.

DETAILED DESCRIPTION

To support continuous operations, computer memory systems may utilize fault tolerance to handle faults or errors. For a distributed memory system on a multiple node computer cluster, memory on a node may be made fault tolerant through memory replication and redundancy on remote nodes within the computer cluster. For example, a first node in a computer cluster may store a memory update in its own memory, a first redundant copy of the memory update on a second node, and a second redundant copy of the memory update on a third node. Similarly, the first node may store redundant copies of memory updates from the second and third nodes. If a failure occurs on the first node, the first node's memory update may be accessed by retrieving one of the two redundant copies while the failed component is repaired.

A redundant copy can be located by accessing location information for the redundant copies. When a redundant copy of a memory update is stored on a remote node, software creates location information about where the redundant copy is stored, such as a look-up table containing the address of the redundant copy. In the event of a failure of the home node, a system can find the address of the redundant copy through an object location algorithm and look-up the address of the copy on the remote node, often navigating through a memory hierarchy to access the location information. If a redundant copy is lost and needs to be restored, the original location may not be determined from the copy's location information.

According to embodiments of the disclosure, the locations of original and redundant data blocks may be determined through a location mapping algorithm. This mapping algorithm supports replicating data blocks to other nodes by mapping to a remote node and address that contain the data block. Redundant copies of data blocks may be stored according to coordinates generated by the mapping algorithm from the type of address and node ID of the original memory page. The type of address and node ID represent the redundancy level of the address and node ID, respectively. Given a node ID and address of an original data block, the redundant address location mapper calculates the node ID and address of a redundant copy of the data block. Similarly, given the address and node ID of a redundant copy, the mapper calculates the address and node ID of the original data block. When a component on a node fails, the mapper may receive the intended address and node ID of the data block for the failed node and identify a replica data block on a remote node.

Mapping Method

FIG. 1 is a method of mapping redundant memory locations in a redundant system, according to embodiments of the disclosure. An address and a node ID for a data block are received by a redundant location address mapper, as in 101. The node ID may be a node on a computer system on which the data block, such as a database update, is located. The address may be an address on a node where the data block is stored.

The address type finder determines an address type for the address, as in 102. The address type classifies the redundancy level of the address by the origination status of the information stored at the address, such as origin or redundant copy. A node ID type finder determines a node ID type for the node ID, as in 103. The node ID type classifies the redundancy level of the node in a redundant group, such as first node or second node in a cluster. For example, in a three node system, an original piece of information may be stored on a first node at a first address designated as a first address type, a first copy of the information may be stored on a second node at a second address designated as a second address type, and a second copy of the information may be stored on a third node at a third address designated as a third address type.

The address type is evaluated as to whether the address is an origin address or a copy address. If the address is an origin address, then a copy finder may determine the copy address(es) and node ID(s), as in 105. If the address is a copy address, then an origin finder may determine the origin address and node ID, as in 106. Once the desired address and node ID are determined, the determined address and node ID may be outputted, as in 107.

When an original data block is first generated, the redundant address location mapper may store redundant copies according to the mapping algorithm described above. The redundant address location mapper may support single-copy redundancy or dual-copy redundancy. In single-copy redundancy, system software or logic may allocate every other memory page to storing an original page, leaving an extra page for hardware use to store a redundant copy; similarly, in dual-copy redundancy, system software or logic may allocate every third memory page to storing an original page, leaving two extra pages for redundant copies. The number of nodes needed for the redundancy mapping may be dependent on the type of redundancy used. For example, if the system is single-redundant, then the system will group the nodes in groups of two for redundancy purposes; if the system is dual-redundancy, the system will group the nodes in groups of three. Once the original and redundant addresses are stored, the redundant address location mapper may later be used to find those original or redundant addresses based on an address and node ID input.

FIG. 2 is a method for determining an address or node ID type using a type finder for a three node redundancy group, according to embodiments of the disclosure. For a dual-redundancy system having three nodes, a type finder may use modulo-3 logic to determine a type for an address and node ID. A type finder receives an address or a node ID, as in 201. The address or node ID may be a set number of bits long. For example, an address may be 44 bits long, while a node ID may 12 bits long.

The even bits of the address or node ID are summed and the odd bits of the address or node ID are summed, as in 202. The type finder determines a difference between the sum of the even bits and the sum of the odd bits, as in 203. The difference is used to index into a type information table, as in 204. The type information table outputs the type of the address or node ID, as in 205.

The function of a redundant location address mapper may be represented as a matrix. FIG. 3A is an example matrix of original and redundant memory mapping locations of a three node redundancy group, according to embodiments of the disclosure. Each column of the matrix represents a node ID type used to identify the node at which an origin or copy is stored, while each row represents an address type at the node on which the origin or copy is stored. Each node contains an original (X) data block on its own memory, as well as a first (X') or second (X") copy of each of the other two nodes' data blocks. Each row contains only the addresses of one type; for example, all the addresses having address type 00 are origins (X), while all the addresses having address type 01 are first copies (X').

FIG. 3B is an example table of redundant copy locations based on origin locations for a three node redundancy group, according to embodiments of the disclosure. For a given node ID type and address type (e.g. 00 for all origins), the locations of the first and second copies of the data block may be determined in the matrix of FIG. 3A. For example, copies of Node B's original data block B, stored at Node ID 01 and address type 00, may be stored as a first copy (B') at Node ID 10 and address type 01 and as a second copy (B") at Node ID 00 and address type 10.

FIG. 3C is an example table of origin locations based on redundant copy locations for a three node redundancy group, according to embodiments of the disclosure. For a given node ID type and address type (01 and 10), the locations of the origin of the copies may be determined in the matrix of FIG. 3A. For example, the original data block (B) may be recalled from the first copy (B'), found at Node ID 10 and address type 01, as Node ID type 01 and address type 00.

Components

FIG. 4 is a diagram of a distributed memory system utilizing one or more redundant location address mappers, according to embodiments of the disclosure. The distributed memory system contains three systems 401 each having a node 402: system 1 401A having node A 402A, system 2 401B having node B 402B, and system 3 401C having node C 402C. Each system may have one or more nodes 402, depending on the hardware resources of the system. The systems may be in communication with one or more client systems 405, and may be connected to additional networks, such as storage area networks. The nodes 402 form a redundancy group for fault tolerance, indicated by a dashed line. Each node 402 contains a CPU 403, memory 404, and redundant location address mapper 405.

FIG. 5A is a diagram of a redundant memory location mapper, according to embodiments of the disclosure. A node ID 501 and address 502 are sent to a type finder 503, a copy mapper/finder 504, and an origin finder 505. A node ID type 506 and address type 507 may be determined from the node ID 501 and address 502, respectively, by the type finder 503. If the type finder 503 indicates that the node ID 501 and address 502 belong to an origin, the copy mapper/finder 504 may output one or more copy addresses 508 and node IDs 509 for any redundant copies. If the type finder 503 indicates that the node ID 501 and address 502 belong to a copy, the origin finder 505 may output an origin address 510 and an origin ID 511 for the copy.

FIG. 5B is an example truth table of outputs from the redundant memory location mapper having a three node redundancy group, according to embodiments of the disclosure. For an address type 507 of 00 (signifying that the input address 502 is an origin address), the copy mapper/finder 504 outputs a copy 1 address 508A, a copy 1 node ID 509A, a copy 2 address 508B, and a copy 2 node ID 509B. For an address type 507 of 01 or 10 (signifying that the input address 502 is a copy address), the origin finder 505 outputs an origin address 510 and an origin node ID 511.

Type Finder

A type finder may determine an address or node ID type from an address or node ID, respectively. A single type finder may be used for both an address and a node ID; however, separate type finders for an address and a node ID may be associated with an address input and a node ID input, respectively, if desired.

FIG. 6 is a diagram of type finder logic for a dual-redundancy system, according to embodiments of the disclosure. In this example, a system has three nodes and each address contains 44 bits. The odd-numbered bits of the address are summed by odd bit adder logic 601 to determine an odd bit summation ($\Sigma_{odd}$). The even-numbered bits of the address are summed by even bit adder logic 602 to determine an even bit summation ($\Sigma_{even}$). The odd bit summation ($\Sigma_{odd}$) and the even bit summation ($\Sigma_{even}$) input into subtractor logic 603. The subtractor logic 603 determines a difference (D) between the odd bit summation ($\Sigma_{odd}$) and the even bit summation ($\Sigma_{even}$). The adder and subtractor logic may contain addition and subtraction logic such as full, half, and complement adders configured according to the size of the address or node ID.

The difference (D) calculated above indexes into a type information table 604, which receives the difference and outputs an address type according to the difference. The size of the type information table 604 may be dependent on the bit length of the address or node ID. For example, if the address is a 44 bit address, the address type information table 604 may be sized for entries from index values of 22 to −22. If the index value is 21, the type output is 00, which may correlate with an original address.

The output of the type finder may be configured according to the divisibility of the index values based on the redundancy of the system. The type finder logic may be configured differently depending on the redundancy configuration of the system. In a dual-redundancy system having three nodes in a redundancy group, the type information table may be configured to multiples of three. If an original memory page is stored every three addresses, then the type information table will repeat a certain type every three addresses. In a single redundancy system, a type finder may assign a type according to a pattern for a factor of two, such as by analyzing the last bit of an address to determine whether it is for an original or a copy.

Copy Mapper/Finder

In the event that a system fails and an original data block stored on a node on the system cannot be accessed, one or more redundant copy locations of the data block may be determined. An address and node ID of the original may be processed through the copy mapper/finder, along with an address type of the address and a node ID type of the node ID, to determine the address and node ID of the redundant copy or copies of the data block.

FIG. 7 is a diagram of copy mapper/finder logic, according to embodiments of the disclosure. The node ID portion of the copy mapper/finder logic is configured to generate possible node IDs for each copy from an origin node ID 701, select among the generated node IDs based on the origin node ID type 702, and output a copy 1 node ID 704 and a copy 2 node ID 705. The address portion of the copy mapper/finder logic is configured to generate incremental addresses from an origin address 703 and output a copy 1 address 706 and a copy 2 address 707.

For example, an origin node ID 701 having an origin node ID type 702 of 01 and an origin address 703 inputs into the copy mapper/finder logic, as in the example of FIG. 3B above. The origin node ID type selects the "1" value from the two multiplexors 708 and 709. The first multiplexor 708 outputs a copy 1 node ID 704 that is incremented by 1 from the origin node ID 701 (thus having a copy node ID type of 10). The second multiplexor 709 outputs a copy 2 node ID 705 that is decremented by 1 from the origin node ID 701 (thus having a copy node ID type of 00). The origin address increments by 1 for copy 1 address 706 (thus having a copy address type of 01) and increments by 2 for copy 2 address 707 (thus having a copy address type of 10).

Origin Finder

In the event that a system fails and a redundant copy of a data block stored on a node in the system cannot be accessed, the original memory page location may be determined. A node ID and address of the redundant copy may be processed through the origin finder, along with an address type of the address and a node ID type of the node ID, to determine the address and node ID of the original memory page.

FIG. 8 is a diagram of origin finder logic, according to embodiments of the disclosure. The node ID portion of the origin finder logic is configured to generate possible node IDs for an origin from a copy node ID 801, select among the generated node IDs based on a copy node ID type 802 and a copy address type 805, and output an origin node ID 804. The address portion of the copy mapper/finder logic is configured to generate decremental addresses from a copy address 803, select between the decremental addresses based on the copy address type 805, and output an origin address 806.

For example, a copy node ID 801 having a copy node ID type 802 of 10 and a copy address 803 having a copy address type 805 of 01 inputs into the origin finder logic, as in the example of FIG. 3C above. The copy node ID type selects the "2" value from the first two multiplexors 807 and 808. The first multiplexor 807 outputs a value that decremented by 1 from the copy node ID 801 (for the possibility that the copy node ID 801 is a first copy) and the second multiplexor 808 outputs a value decremented by 2 from the copy node ID 801 (for the possibility that the copy node ID 801 is a second copy). The copy address type 805 selects the "1" value from the third multiplexor 809, indicating that the copy node ID 801 and copy address 803 are for a first copy of the data block. The third multiplexor 809 outputs an origin node ID 804 that is decremented by 1 from the copy node ID 801 (thus having an origin node ID type of 01). The copy address type 805 selects the "1" value from the fourth multiplexor 810. The fourth multiplexor 810 outputs an origin address 806 that is decremented by 1 from the copy address 803 (thus having an origin address type of 00).

While the logic of the copy mapper/finder and origin finder have been expressed to create the example matrix of FIG. 3A, the logic may be changed to create other matrices that exhibit a consistent pattern that may be used to classify the address types and node ID types according to the redundancy and system configuration. For example, the node ID logic of FIG. 7 and FIG. 8 may be changed so that the first MUX 708 and the second MUX 709 are swapped, and the first MUX 807 and the second MUX 808 are swapped. For the resulting matrix correlated with FIG. 3A, Node A may have A in row 00, B' in row 01, and C" in row 10, while node B may have B in row 00, C' in row 01, and A" in row 10. As long as a consistent algorithm correlated with the redundancy configuration is used to classify the address and node ID by type, different logical configurations may be used.

Although the present disclosure has been described in terms of specific embodiments, it is anticipated that alterations and modifications thereof will become apparent to those skilled in the art. Therefore, it is intended that the following claims be interpreted as covering all such alterations and modifications as fall within the true spirit and scope of the disclosure.

What is claimed is:

1. A method for mapping addresses in a multi-node system, comprising:
    receiving a first address and a first node ID that represents a first node in the multi-node system;
    determining a first address type that indicates whether the first address is associated with original data or a redundant copy of the original data, wherein determining the first address type comprises:
        summing the even bits of the first address to an address even bits sum,
        summing the odd bits of the first address to an address odd bits sum,
        determining an address difference between the address even bits sum and the address odd bits sum,
        indexing into an address type information table using the address difference, and
        outputting the first address type from the address type information table;
    determining a first node ID type that represents a redundancy level for the first node relative to one or more other nodes in the multi-node system, wherein determining the first node ID type comprises:
        summing the even bits of the first node ID to a node ID even bits sum,
        summing the odd bits of the first node ID to a node ID odd bits sum,
        determining a node ID difference between the node ID even bits sum and the node ID odd bits sum,
        indexing into a node ID type information table using the node ID difference, and
        outputting the first node ID type from the node ID type information table;
    in response to the first address type indicating that the first address is associated with the original data, determining a second address and a second node ID that represents a second node in the multi-node system for the redundant copy of the original data based on the first address, the first node ID, and the first node ID type; and
    accessing the second address on the second node.

2. The method of claim 1, wherein accessing the second address on the second node comprises writing the redundant copy of the original data to the second address on the second node.

3. The method of claim 2, wherein the redundant copy of the original data written to the second address on the second node is a first redundant copy of the original data, and further comprising:
    computing a third address and a third node ID that represents a third node in the multi-node system for a second redundant copy of the original data based on the first address, the first node ID, and the first node ID type.

4. The method of claim 3, wherein the first address type and the first node ID type are determined using modulo-3 logic.

5. The method of claim 1, wherein the first address type and the first node ID type are determined using modulo-2 logic.

6. The method of claim 1, wherein the first address type is determined based on the first address.

7. The method of claim 1, wherein the first node ID type is determined based on the first node ID.

8. A method for accessing addresses in a multi-node system, comprising:
    receiving a first address and a first node ID that represents a first node in the multi-node system;
    decoding a first address type representing an address redundancy level from the first address, wherein decoding the first address type from the first address comprises:
        summing the even bits of the first address to an address even bits sum,
        summing the odd bits of the first address to an address odd bits sum,
        determining an address difference between the address even bits sum and the address odd bits sum,
        indexing into an address type information table using the address difference, and
        outputting the first address type from the address type information table;
    decoding a first node ID type representing a node ID redundancy level for the first node from the first node ID, wherein decoding the first node ID type from the first node ID comprises:
        summing the even bits of the first node ID to a node ID even bits sum,
        summing the odd bits of the first node ID to a node ID odd bits sum,
        determining a node ID difference between the node ID even bits sum and the node ID odd bits sum,
        indexing into a node ID type information table using the node ID difference, and
        outputting the first node ID type from the node ID type information table;
    determining a second address and a second node ID that represents a second node in the multi-node system based on the first address type and the first node ID type; and
    retrieving data from the second address on the second node.

9. The method of claim 8, wherein the first address type indicates that the first address is associated with original data, and retrieving the data from the second address on the second node comprises reading a redundant copy of the original data from the second address on the second node.

10. The method of claim 8, further comprising:
    determining whether the first address is associated with original data or a redundant copy of the original data based on the first address type.

11. The method of claim 10, wherein the first address type indicates that the first address is associated with the original data, and the second address on the second node is for the redundant copy of the original data.

12. The method of claim 11, wherein the redundant copy of the original data of which the second address on the second node is for is a first redundant copy of the original data, and further comprising:
computing a third address and a third node ID that represents a third node in the multi-node system for a second redundant copy of the original data based on the first address, the first node ID, and the first node ID type.

13. The method of claim 12, wherein the first address type and the node ID type are determined using modulo-3 logic.

14. The method of claim 10, wherein the first address type indicates that the first address is associated with the redundant copy of the original data, and the second address on the second node is for the original data.

15. The method of claim 8, wherein the first address type and the first node ID type are determined using modulo-2 logic.

16. A system for redundant memory mapping, comprising:
at least one processor; and
a memory storing instructions that upon execution by the at least one processor cause the system to:
determine a first address type for a first address, the first address type indicating whether the first address is associated with original data or a redundant copy of the original data, wherein the instructions cause the system to determine the first address type for the first address by causing the system to:
sum even bits of the first address to an address even bits sum,
sum odd bits of the first address to an address odd bits sum,
determine an address difference from the address even bits sum and the address odd bits sum,
index the address difference into an address type information table, and
output the first address type;
determine a first node ID type for a first node ID that represents a first node in a multi-node system, the first node ID type representing a redundancy level for the first node relative to one or more other nodes in the multi-node system, wherein the instructions cause the system to determine the first node ID type for the first node ID by causing the system to:
sum even bits of the first node ID to a node ID even bits sum,
sum odd bits of the first node ID to a node ID odd bits sum,
determine a node ID difference from the node ID even bits sum and the node ID odd bits sum,
index the node ID difference into a node ID type information table, and
output the first node ID type;
in response to the first address type indicating that the first address is associated with the original data, determine a second address and a second node ID for the redundant copy of the original data from the first address, the first node ID, and the first node ID type; and
in response to the first address type indicating that the first address is associated with the redundant copy of the original data, determine a third address and a third node ID for the original data from the first address, the first address type, the first node ID, and the first node ID type.

17. The system of claim 16, wherein the instructions cause the system to determine the first address type based on the first address, and determine the first node ID type based on the first node ID.

* * * * *